US008654978B2

(12) United States Patent
Shimotono

(10) Patent No.: US 8,654,978 B2
(45) Date of Patent: Feb. 18, 2014

(54) APPARATUS, METHOD, AND COMPUTER PROGRAM PRODUCT FOR ACCESS CONTROL TO A MOBILE TERMINAL

(75) Inventor: Susumu Shimotono, Hadano (JP)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 212 days.

(21) Appl. No.: 13/348,530

(22) Filed: Jan. 11, 2012

(65) Prior Publication Data

US 2012/0185931 A1 Jul. 19, 2012

(30) Foreign Application Priority Data

Jan. 19, 2011 (JP) ................................ 2011-008401

(51) Int. Cl.
*H04K 1/00* (2006.01)

(52) U.S. Cl.
USPC ........ 380/270; 726/4; 726/5; 726/17; 726/27; 713/168; 713/323

(58) Field of Classification Search
USPC ............. 380/270; 713/168, 323; 726/4, 5, 17, 726/27, 34, 35; 340/669
See application file for complete search history.

(56) References Cited

U.S. PATENT DOCUMENTS 5,227,929 A * 7/1993 Comerford ..................... 360/75
5,491,486 A * 2/1996 Welles et al. ............ 342/357.74
5,781,156 A * 7/1998 Krasner ................... 342/357.77
5,982,573 A * 11/1999 Henze ............................ 360/75
6,044,698 A * 4/2000 Bryan ............................ 73/146
6,067,460 A * 5/2000 Alanara et al. ................ 455/574
6,520,013 B1 * 2/2003 Wehrenberg .................... 73/489
6,612,157 B2 * 9/2003 Urano et al. ................. 73/65.01
6,768,066 B2 * 7/2004 Wehrenberg ............... 200/61.49
6,771,449 B1 * 8/2004 Ito et al. ......................... 360/75
6,970,095 B1 * 11/2005 Lee et al. ...................... 340/669

(Continued)

FOREIGN PATENT DOCUMENTS

JP 05035354 A * 2/1993 ................ G06F 1/00
JP 05-134904 6/1993

(Continued)

OTHER PUBLICATIONS

Kay, Russell, "Blowing the whistle on Laptop Theft", 2001 Computerworld.com http://www.computerworld.com/mobiletopics/mobile/story/0,1081,59,00.html.*

(Continued)

*Primary Examiner* — Kambiz Zand
*Assistant Examiner* — Tongoc Tran
(74) *Attorney, Agent, or Firm* — Kunzler Law Group

(57) ABSTRACT

An apparatus, computer program product, and method are disclosed for access control to a mobile terminal. A use end event is generated indicating an end of use of a mobile terminal. Acceleration of the mobile terminal is binarized by the mobile terminal after the use end event is generated to one of a first value indicating a stationary state and a second value indicating a moving state. A use start event is generated indicating a start of use of the mobile terminal. A movement preparation period is measured from a time at which the use end event is generated to a time at which a transition from the first value to the second value occurs. Use authentication is requested in response to the use start event and in response to the movement preparation period exceeding a first threshold.

20 Claims, 4 Drawing Sheets

(56) References Cited

U.S. PATENT DOCUMENTS

| | | | | |
|---|---|---|---|---|
| 7,024,698 | B2 * | 4/2006 | Tanaka et al. | 726/26 |
| 7,024,700 | B1 * | 4/2006 | Horikoshi et al. | 726/34 |
| 8,532,670 | B2 * | 9/2013 | Kim et al. | 455/456.1 |
| 2002/0073334 | A1 * | 6/2002 | Sherman et al. | 713/201 |
| 2004/0088773 | A1 * | 5/2004 | Andrews | 2/49.1 |
| 2004/0123161 | A1 * | 6/2004 | Harada et al. | 713/202 |
| 2004/0125498 | A1 * | 7/2004 | Schmidt | 360/78.04 |
| 2004/0252401 | A1 * | 12/2004 | Abe et al. | 360/75 |
| 2005/0088773 | A1 * | 4/2005 | Yoshida | 360/75 |
| 2005/0099719 | A1 * | 5/2005 | Katai et al. | 360/75 |
| 2008/0305771 | A1 * | 12/2008 | Yajima et al. | 455/411 |
| 2009/0005080 | A1 * | 1/2009 | Forstall et al. | 455/456.3 |

FOREIGN PATENT DOCUMENTS

| | | |
|---|---|---|
| JP | 2006-139757 | 6/2006 |
| JP | 2007013546 | 1/2007 |
| JP | 2008306412 | 12/2008 |
| WO | 02103497 | 12/2002 |

OTHER PUBLICATIONS

Windman, Russel, “DNet: One Small Step for Laptop Security” 2001, ZD Inc. http://www.zdnetcom/products/stories/reviews/0,416,2704709,00.html.*

Cavep Anti-theft PC Card Installation & setup Guide 2001-2002 Caveo Technology.*

* cited by examiner 200
201
207
203

200
201
205
UNLOCK
203

200
201
203

200
201
203

APPARATUS, METHOD, AND COMPUTER PROGRAM PRODUCT FOR ACCESS CONTROL TO A MOBILE TERMINAL

CROSS-REFERENCE TO RELATED APPLICATIONS

This application is a national patent application and claims priority to Japanese Patent Application Number 2011-008401 entitled "Mobile Terminal Having Security Function of Excellent Convenience, and Access Control Method" and filed on 19 Jan. 2011 for Susumu Shimotono, which is incorporated herein by reference.

FIELD

The present subject matter relates to a security function of improved convenience in a mobile terminal, and more particularly relates to a technique of controlling access by determining whether the mobile terminal is under control of its user or there is a possibility of the mobile terminal being under control of a third party.

BACKGROUND

Description of the Related Art

A computer has various security functions for protecting information from unauthorized access by a third party. For example, one security function prohibits booting unless user authentication by a password or a fingerprint is successful when starting a computer. Another security function determines that its user is not in front of the computer when an idle state continues for a predetermined period, and displays a screensaver or switches to a suspend state in order to prevent a third party from stealing data or viewing a screen while the user is away from the computer. Upon resumption, the security function requests user authentication by a password or a fingerprint. A procedure of authentication by a password or a fingerprint, while effective at preventing unauthorized access by the third party, requires time and effort by the user.

Japanese Unexamined Patent Publication No. 2007-13546 (hereinafter "Patent Document 1") discloses a mobile terminal that prohibits input to input means in the case of determining that the mobile terminal is in an abnormal state. The abnormal state is described as including a drop or impact state determined according to an acceleration detected by an acceleration sensor, and a abandoned state determined according to an uncharged condition.

International Patent Publication No. WO2002-103497 (hereinafter "Patent Document 2") discloses a portable information processing device that is adapted to both stationary use on a desk or the like for some time and portable use of being freely carried around, and reduces a risk of information theft. As described in Patent Document 2, the portable information processing device disables some functions when a cumulative value of travel distance reaches a predetermined reference value. Patent Document 3 discloses a mobile terminal that achieves both convenience and security protection to keep the user from feeling troublesome.

As described in Patent Document 3, a state of a mobile phone is classified as one of "moving intensely", "moving slowly", "remaining stationary", or "falling". In the case of "moving intensely", the mobile phone is determined as "in an abnormal state". In the case of "moving slowly", the mobile phone is determined as "not in an abnormal state and not left". In the case of "falling", the mobile phone is determined as "in an abnormal state". In the case of "remaining stationary", the mobile phone is determined as "left" when a lid open/close sensor detects that the lid is closed, and as "not in an abnormal state and not left" when the lid open/close sensor detects that the lid is open.

BRIEF SUMMARY

Recent years have seen an increasing need in business situations for the user to, while maintaining a use state of a laptop mobile computer (hereafter referred to as a laptop PC) used in an office, bring the laptop PC into a meeting room and use the laptop PC in the meeting room. In a brief movement such as from the office to the meeting room, the user, in an attempt to avoid inconvenience of password input which is requested when opening a lid of the laptop PC at the destination once the user has closed the lid, tries to carry the laptop PC without closing the lid. This causes a stress on a housing of the laptop PC and a danger of drop, as the laptop PC is held in an unstable state of having its lid open. In such situations, improved convenience can be achieved if it is possible to skip such password input by checking that the laptop PC is clearly under control of the user who owns the laptop PC.

In order to skip the password input, it is necessary to control access based on recognition that there is little or no possibility of the laptop PC being under control of the third party during a period from when the laptop PC is used in the office to when the laptop PC is moved into the meeting room. In the subject matters described in Patent Documents 1 and 3, the abnormal state is detected as any of the three states that are drop, impact, and abandoned, according to the acceleration detected by the acceleration sensor. However, unlike the mobile phone that could slip from a pocket or the like, the laptop PC has a low possibility of falling into the third party's hands or becoming accessible by the third party as a result of drop or impact. Therefore, the acceleration measurement method applied to the mobile phone is not effective in detecting that the laptop PC is under control of the third party.

In the subject matter described in Patent Document 3, when the lid open/close sensor detects that the lid is closed in the case where the mobile phone is classified as stationary by the acceleration sensor, the mobile phone is determined as being abandoned. Hence, in the case of carrying the laptop PC from the office to the meeting room with its lid closed, the lock mechanism is activated at the moment when the lid is closed. This creates a need to input a password upon arriving at the meeting room. Besides, in the method described in Patent Document 2, detection is impossible in the case where the third party takes the device to a nearby location.

In view of the above, the present subject matter, in some embodiments, has an object of providing a mobile terminal that, when a possibility of the mobile terminal falling under control of the third party arises, determines that the mobile terminal is under control of the user of the mobile terminal, and skips user authentication. The present subject matter, in some embodiments, also has an object of providing a mobile terminal having a security function that ensures convenience at the time of use after movement. The present subject matter, in some embodiments, further has an object of providing an access control method and a computer program for such a computer.

In the present subject matter, in some embodiments, on a premise that the mobile terminal is under control of the user who owns the mobile terminal during use, security and convenience are achieved in harmony based on a behavior of a person holding the mobile terminal from when he/she ends using the mobile terminal to when he/she starts using the mobile terminal again. In some embodiments when the use of the mobile terminal ends, the mobile terminal is abandoned, which raises a possibility of the mobile terminal falling under control of the third party. To prevent this in some embodiments, in the case of detecting a use end event, the mobile terminal requests user authentication when subsequently detecting a use start event.

Meanwhile, there is also a need, in some embodiments, for the user to use the mobile terminal immediately when arriving at the meeting room, in the case of moving from the office to the meeting room in a short period. If the mobile terminal is capable of recognizing that the mobile terminal is under control of the user during the movement from the office to the meeting room, security may be ensured without requesting user authentication when the user starts using the mobile terminal in the meeting room.

A method is presented for access control to a mobile terminal. A use end event may be generated indicating an end of use of a mobile terminal. Acceleration of the mobile terminal may be binarized by the mobile terminal after the use end event is generated to one of a first value indicating a stationary state and a second value indicating a moving state. A use start event may be generated indicating a start of use of the mobile terminal. A movement preparation period may be measured from a time at which the use end event is generated to a time at which a transition from the first value to the second value occurs. Use authentication may be requested in response to the use start event and in response to the movement preparation period exceeding a first threshold.

In one embodiment, the method further includes measuring a temporary stationary period from a time at which a transition from the second value to the first value occurs to a time at which a transition from the first value to the second value occurs. In another embodiment, the temporary stationary period is a period during which the mobile terminal continues in a temporary stationary state. The method, in one embodiment, may also include requesting the user authentication in response to the use start event and in response to the movement preparation period not exceeding the first threshold and the temporary stationary period exceeding a second threshold.

In a further embodiment, the method further includes measuring a use preparation period from a time at which a transition from the second value to the first value occurs to a time at which the use start event is generated. In one embodiment, user authentication is requested in response to the use start event and in response to the movement preparation period not exceeding the first threshold, the temporary stationary period not exceeding the second threshold, and the use preparation period exceeding a third threshold. In another embodiment, access is permitted without requesting the user authentication in response to the use start event and in response to the movement preparation period not exceeding the first threshold, the temporary stationary period not exceeding the second threshold, and the use preparation period not exceeding the third threshold.

In one embodiment, a use preparation period is measured from a time at which a transition from the second value to the first value occurs to a time at which the use start event is generated. In a further embodiment, the user authentication is requested in response to the use start event and in response to the movement preparation period not exceeding the first threshold and the use preparation period exceeding a third threshold.

The use end event, in one embodiment, is generated in response to closing of a display housing of the mobile terminal, and the use start event is generated in response to opening of the display housing of the mobile terminal. In another embodiment, a processor continues operation from the use end event to the use start event.

A mobile terminal is also presented. The mobile terminal is configured in the disclosed embodiments to substantially carry out the steps of the method presented above. In one embodiment, the mobile terminal includes an acceleration sensor, an acceleration data processing unit, an acceleration data recording unit, and a determination unit. The acceleration sensor may measure an acceleration of the mobile terminal. The acceleration data processing unit may generate acceleration data obtained by binarizing an output of the acceleration sensor to a first value indicating a stationary state and a second value indicating a moving state. The acceleration data recording unit may record the acceleration data from a use end event indicating an end of use of the mobile terminal to a use start event indicating a start of use of the mobile terminal. The determination unit may measure, in response to the use start event, a movement preparation period from a time at which the use end event is generated to a time at which a transition from the first value to the second value occurs using the acceleration data. The determination unit may also determine access prohibition for the mobile terminal in response to the movement preparation period exceeding a first threshold.

In one embodiment, the determination unit measures a temporary stationary period from a time at which a transition from the second value to the first value occurs to a time at which a transition from the first value to the second value occurs. The determination unit, in a further embodiment, determines the access prohibition for the mobile terminal in response to the movement preparation period not exceeding the first threshold and the temporary stationary period exceeding a second threshold.

In another embodiment, determination unit measures a use preparation period from a time at which a transition from the second value to the first value occurs to a time at which the use start event is generated. In a further embodiment, the determination unit determines the access prohibition for the mobile terminal in response to the movement preparation period not exceeding the first threshold, the temporary stationary period not exceeding the second threshold, and the use preparation period exceeding a third threshold. In one embodiment, the determination unit determines access permission for the mobile terminal in response to the movement preparation period not exceeding the first threshold, the temporary stationary period not exceeding the second threshold, and the use preparation period not exceeding the third threshold.

In one embodiment, the determination unit measures a use preparation period from a time at which a transition from the second value to the first value occurs to a time at which the use start event is generated. In a further embodiment, determination unit determines the access prohibition for the mobile terminal in response to the movement preparation period not exceeding the first threshold and the use preparation period exceeding a third threshold.

In another embodiment, the mobile terminal is a mobile information processing device that includes a system housing and a display housing attached to the system housing so as to be openable and closable. In one embodiment, the use end event and the use start event are generated according to an open/close state of the display housing. In a further embodiment, the mobile terminal is a tablet electronic device, the use end event is generated when there is no input to the tablet electronic device for a predetermined period and the use start event is generated when an access button of the tablet electronic device is pressed.

In one embodiment, a method includes generating a use end event indicating an end of use of the mobile terminal. The method may also include measuring, by the mobile terminal, a movement preparation period from a time at which the use end event is generated to a time when movement of the mobile terminal starts. The method may further include generating a use start event indicating a start of use of the mobile terminal. The method may also include requesting user authentication in response to the use start event and in response to the movement preparation period exceeding a predetermined threshold.

A computer program product is also presented. The computer program produce is configured in the disclosed embodiments to substantially carry out the steps of the method presented above. A use end event may be generated indicating an end of use of an information processing device. The computer program produce may be configured to determine whether an acceleration measured by the information processing device after the use end event is generated indicates a stationary state or a moving state. A use start event may be generated indicating a start of use of the information processing device. A movement preparation period may be measured from a time at which the use end event is generated to a time at which a transition from the stationary state to the moving state occurs. Access to the information processing device may be restricted in response to the use start event and in response to the movement preparation period exceeding a first threshold.

In one embodiment, the computer program product is further configured to measure a temporary stationary period from a time at which a transition from the moving state to the stationary state occurs to a time at which a transition from the stationary state to the moving state occurs. The temporary stationary period, in one embodiment, is a period during which the information processing device continues in a temporary stationary state. In a further embodiment, the computer program product is further configured to restrict access to the information processing device in response to the use start event and in response to the movement preparation period not exceeding the first threshold and the temporary stationary period exceeding a second threshold.

In one embodiment, the computer program product is further configured to measure a use preparation period from a time at which a transition from the moving state to the stationary state occurs to a time at which the use start event is generated. In a further embodiment, the computer program product is further configured to restrict access to the information processing device in response to the use start event and in response to the movement preparation period not exceeding the first threshold, the temporary stationary period of not exceeding the second threshold, and the use preparation period exceeding a third threshold.

In another embodiment, the computer program product is further configured to permit access to the computer in response to the use start event and in response to the movement preparation period not exceeding the first threshold, the temporary stationary period not exceeding the second threshold, and the use preparation period not exceeding the third threshold. The computer program product is further configured, in one embodiment, to measure a use preparation period from a time at which a transition from the second value to the first value occurs to a time at which the use start event is generated. In a further embodiment, the computer program product is further configured to restrict access to the computer in response to the use start event and in response to the movement preparation period not exceeding the first threshold and the use preparation period exceeding a third threshold.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
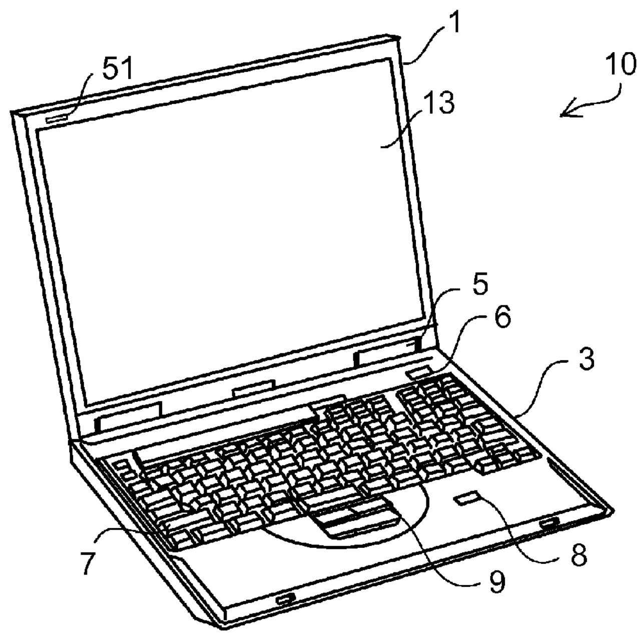
FIG. 1 is a perspective view showing one embodiment of an appearance of a laptop PC in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof, A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

[Exemplary Structure of a Laptop PC]

FIG. 1 is a perspective view showing an appearance of a laptop PC 10. The laptop PC 10 has a display housing 1 supported by being connected to a system housing 3 by a hinge 5 so as to be openable and closable. In one embodiment, the display housing 1 houses a liquid crystal display (LCD) 13. A keyboard 7 and a pointing device (mouse) 9 are mounted on a surface of the system housing 3. In addition, a window 8 for swiping a finger for fingerprint authentication is formed on the system housing 3. A power button 6 for powering on the laptop PC 10 is provided on the display housing 3. Further, a lid sensor 51 for detecting an open/close state of the display housing 1 is attached to an upper edge of the display housing 1.

Figure 2:
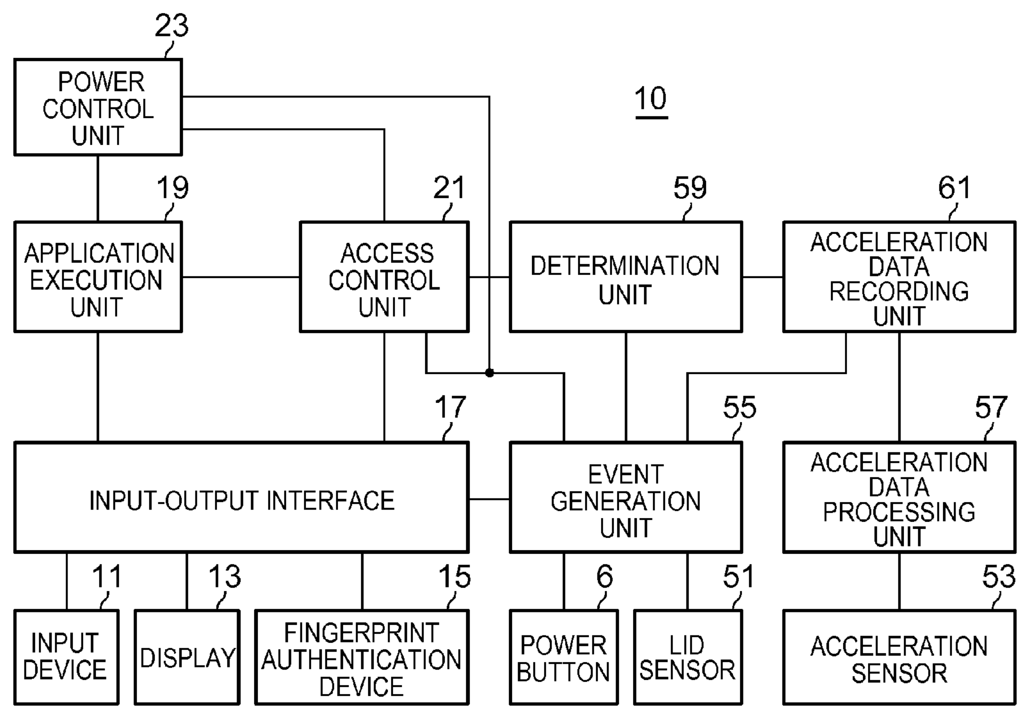
FIG. 2 is a functional block diagram showing on embodiment of a structure of the laptop PC according to the present subject matter.

FIG. 2 is a functional block diagram showing a main structure of the laptop PC 10 according to the present subject matter. An input device 11 may include the keyboard 7 and the pointing device 9. In the case where the laptop PC 10 is a tablet computer, the input device may include a touchpad, a digitizer, a software keyboard, and the like. In this embodiment, a password for user authentication is input via the keyboard 7. A display 13 displays image data generated by an application execution unit 19 or an access control unit 21. In this embodiment, a prompt for user authentication by a password or a fingerprint is displayed on the display 13.

A fingerprint authentication device 15 includes a swipe fingerprint sensor attached at a position corresponding to the window 8, and is a device for performing user authentication by a fingerprint instead of a password. An input-output interface 17 may be composed of a controller, a device driver, and the like, and controls data transfer with the input device 11, the display 13, and the fingerprint authentication device 15. The application execution unit 19, the access control unit 21, a determination unit 59, and an acceleration data recording unit 61 may be composed of a CPU, a main memory, an application program, an operating system, and the like.

The application execution unit 19 executes a program for a predetermined work by a user or a system. The access control unit 21 has a user interface function by which the user sets user authentication by a password or a fingerprint. When user authentication is set, the access control unit 21 sets access prohibition in the application execution unit 19 or the input-output interface 17 based on a predetermined event, and displays a prompt for authentication on the display 13. When a password or a fingerprint is input in response to the prompt, the access control unit 21 sets access permission in the application execution unit 19 or the input-output interface 17.

The access control unit 21 is capable of preparing image data different from image data generated by the application execution unit 19 beforehand and displaying the prepared image data on the display, while access prohibition is set. The input-output interface 17 in which access prohibition is set may operate so as not to send an input received from the input device 11 to the application execution unit 19 until access permission is set, except it may not prohibit sending password characters to the access control unit 21. The application execution unit 19 in which access prohibition may be set may be unable to obtain input data from the user, and also unable to put a graphic image output by an application itself, in a state of being visible to the user.

An authentication event for setting user authentication by the access control unit 21 may be received from an event generation unit 55, the application execution unit 19, or the input-output interface 17. Examples of the authentication event may include: an idle period of the CPU, which is received from the application execution unit 19; a period during which input from the input device 11 is suspended, which is received from the input-output interface 17; and an open/close state of the display housing 1 indicated by the lid sensor 51, which may be received from the event generation unit 55. Even when user authentication is set, in the case of being notified of access permission from the determination unit 59, the access control unit 21 may set access permission in the application execution unit 19 or the input-output interface 17 even if there is no input of a password or a fingerprint.

A power control unit 23 has an interface function by which the user sets a power state. The power control unit 23 controls the power state of the laptop PC 10, based on an event received from the access control unit 21, the application execution unit 19, or the event generation unit 55. The power state may be a S0 state (power on state), a S3 state (suspend state), a S4 state (hibernation state), or a S5 state (soft off state) defined in ACPI.

The access control unit 21 can set user authentication in association with power state control by the power control unit 23. For example, in the case where the power control unit 23 resumes the laptop PC 10 from the suspend state, the access control unit 21 can set access prohibition in the application execution unit 19 or the input-output interface 17 unless password authentication or fingerprint authentication is successful at the time of resumption. Alternatively, the access control unit 21 may set user authentication independently of power state control by the power control unit 23.

The power button 6 sends a signal for switching the power state of the laptop PC 10 to the power on state, to the event generation unit 55. The lid sensor 51 detects the open/close state of the display housing 1, and notifies the event generation unit 55 of the open/close state. The event generation unit 55 sends an open event generated based on a signal received from the lid sensor 51 when the display housing 1 is opened and a close event generated based on a signal received from the lid sensor 51 when the display housing 1 is closed, to the acceleration data recording unit 61, the determination unit 59, the access control unit 21, and the power control unit 23.

An acceleration sensor 53 detects an acceleration of the laptop PC 10, in orthogonal three axes. The acceleration sensor 53 may be capable of detecting a gravitational acceleration and an acceleration due to drop or impact. An embodiment may use a change in gravitational acceleration detected in order to determine whether the laptop PC 10 is in a stationary state or a moving state. The acceleration sensor 53 outputs a predetermined analog value where each axis corresponds to the gravitational acceleration.

When the laptop PC 10 is lifted up and as a result changes in posture, the output corresponding to the gravitational acceleration detected in each axis changes from a value indicating the stationary state to a value indicating the moving state. The stationary state corresponds to any of a use state or a abandoned state of the laptop PC 10. The laptop PC 10 held by a person may oscillate so that an alternating-current component is superimposed on the output of each axis. An acceleration data processing unit 57 binarizes the analog output value of each axis based on a predetermined threshold. The binarized output of each axis may be '1' when indicating the moving state when the output of the acceleration sensor 53 is more than the threshold, and '0' indicating the stationary state when the output of the acceleration sensor 53 is less than the threshold.

In one embodiment, the acceleration data processing unit 57 performs a logical OR operation on the binarized three outputs, and sends an operation result to the acceleration data recording unit 61 as acceleration data. The acceleration data recording unit 61 records the received acceleration data at a predetermined sampling interval, from when the acceleration data recording unit 61 receives the close event from the event generation unit 55 to when the acceleration data recording unit 61 receives the open event from the event generation unit 55. When receiving the open event from the event generation unit 55, the determination unit 59 acquires the recorded acceleration data from the acceleration data recording unit 61. When the access control unit 21 sets user authentication, the determination unit 59 determines to cancel user authentication by a password or a fingerprint, and notifies the access control unit 21 of access permission. After sending the acceleration data to the determination unit 59, the acceleration data recording unit 61 resets the recorded acceleration data. The acceleration data recording unit 61 newly starts recording acceleration data, upon receiving the close event.

[Exemplary Access Control Method]

The following figures describe some embodiments of a method of controlling access to the laptop PC 10 where the determination unit 59 determines whether or not to request user authentication.

FIG. 3 shows exemplary acceleration data recorded by the acceleration data recording unit 61 when moving the laptop PC 10 in use and starting using the laptop PC 10 at a destination. FIG. 3A shows acceleration data when the user who is an authorized owner of the laptop PC 10 ends using the laptop PC 10 in an office and moves to a meeting room where he/she starts using the laptop PC 10. The event generation unit 55 generates the close event at a time ts, and generates the open event at a time tf. Three exemplary temporal stages, namely, a start stage S1, an intermediate stage S2, and an end stage S3, are illustrated between the time ts to the time tf, for illustration.

The start stage S1 is a time range defined by a threshold period t1 from the time ts forward in time. The end stage S3 is a time range defined by a threshold period t3 from the time tf backward in time. The intermediate stage S2 is a time range of an intermediate part in a period between the time tf and the time ts excluding the threshold period t1 and the threshold period t3. A mobile time window 80 of a threshold period t2 is set in the intermediate stage S2. The period between the time ts and the time tf may be any length of time but will be discussed as being about 10 minutes, as an example and for simplicity in illustration.

The threshold period t1 may be set to, for example, 10 seconds, as a standard period from when the user closes the display housing 1 in the office to when the user prepares for movement and lifts up the laptop PC 10. The threshold period t3 may be set to, for example, 10 seconds, as a standard period from when the user places the laptop PC 10 on a desk in the meeting room at the destination to when the user opens the display housing 1. The threshold period t2 of the time window 80 is set to, for example, 2 seconds, as a standard period during which the acceleration data temporarily indicates the stationary state when the user holding the laptop PC 10 takes an elevator or stops during the movement. The length of the threshold periods discussed above are exemplary only and may vary considerably.

Figure 3A:
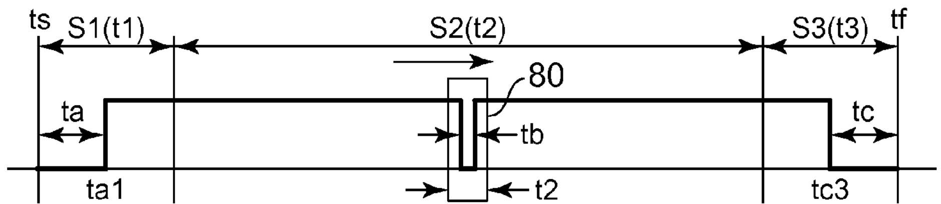
FIG. 3A-3E are diagrams showing one embodiment of a state of a binarized acceleration in accordance with the present subject matter.

In FIG. 3A, the acceleration data remains at 0 from the time is to a time ta1 at which a movement preparation period ta elapses, and changes to 1 after the time ta1. After the time ta1, the acceleration data remains at '1' throughout most of the intermediate stage S2 and until a time tc3 in the end stage S3, changes to '0' at the time tc3, and then remains at '0' to the time tf. A period tb indicating a temporary stationary period where the acceleration data temporarily becomes '0' appears in the intermediate stage S2. The following describes a method of determining a possibility of the laptop PC 10 being under control of the third party, based on the movement preparation period ta, the temporary stationary period tb, and the use preparation period tc which are extracted from this binarized acceleration data.

Here, the expression "the laptop PC 10 is under control of the third party" is given to mean that the laptop PC 10 falls into a state of being potentially accessible by the third party without the user's permission. The state of being potentially accessible by the third party is a state of being able to retrieve data from the laptop PC 10, view information displayed on the display of the laptop PC 10, or input data to the laptop PC 10 in the case where user authentication by a password or a fingerprint is not requested. Situations where the laptop PC 10 can be under control of the third party include both a situation where the laptop PC 10 is moved from a position at which the laptop PC 10 has been under control of the user and a situation where the laptop PC 10 remains at the same position.

Hence, a state where the laptop PC 10 is under control of the third party can be regarded as a state where the user is away from the laptop PC 10 for such a period that enables the third party to access the laptop PC 10. In one embodiment of the present subject matter, whether or not there is a possibility of the laptop PC 10 being under control of the third party is determined by using not only the binarized acceleration data but also the time information. This embodiment is based on a premise that the laptop PC 10 is under control of the user while the laptop PC 10 is being used in the office.

When the event generation unit 55 generates the open event, the determination unit 59 receives acceleration data recorded from the close event to the open event, from the acceleration data recording unit 61. In the start stage S1, the intermediate stage S2, and the end stage S3 from the movement start to the movement end, the determination unit 59 determines a possibility of the laptop PC 10 being under control of the third party, using the threshold periods t1, t2, and t3 and the acceleration data generated from the behavior of the user or the third party in which he/she carries the laptop PC 10 and starts using the laptop PC 10.

Suppose the user, having opened the display housing 1, is operating the input device 11 or viewing the display 13 until just before leaving his/her desk in order to attend a meeting. For the user who works using the laptop PC 10, closing the display housing 1 may mean that he/she stops working there, so that typically the user begins to prepare for movement at once and lifts up the laptop PC 10.

The laptop PC 10 is probably under control of the user at the time ts. After the time ts, however, the user ends using the laptop PC 10, which raises a possibility that the user leaves the laptop PC 10 and that the laptop PC 10 may fall under control of the third party. In the case where the movement preparation period to is short, a period during which the user is away from the laptop PC 10 is short, and so it may be assumed that the laptop PC 10 is under control of the user. This assumption is based on a reason that it is difficult for the third party to carry the laptop PC 10 if only a short period elapses from when the laptop PC 10 is under control of the user.

On the other hand, in the case where the period from when the user closes the display housing 1 to when the user starts carrying the laptop PC 10 is long, it may be assumed that there is a possibility of the laptop PC 10 being under control of the third party. To carry the laptop PC 10, the user closes the display housing 1 at the time ts, and lifts up the laptop PC 10 at the time ta1. The acceleration data generated by the acceleration data processing unit 57 is '0' from the time ts to the time ta1.

The determination unit 59 recognizes the laptop PC 10 to be in the abandoned state, during the movement preparation period ta in which the display housing 1 is closed and the acceleration data is '0' indicating the stationary state. When the laptop PC 10 is lifted up at the time ta1, the acceleration data processing unit 57 outputs '1'. In FIG. 3A, the movement preparation period ta is shorter than the threshold period t1. Since the movement preparation period ta is shorter than the threshold period t1, the determination unit 59 determines that the laptop PC 10 was lifted up by the user, and determines that the process enters the intermediate stage S2 while the laptop PC 10 is under control of the user. There is an instance where the user lifts up the laptop PC 10 before closing the display housing 1 or moves the laptop PC 10 by sliding it on the desk to a position where the display housing 1 can be easily closed. In such an instance, the movement preparation period ta has a length of zero, and the determination unit 59 recognizes there is no abandoned state in the start stage S1, and equally determines that the process enters the intermediate stage S2 while the laptop PC 10 is under control of the user.

In the intermediate stage S2, the determination unit 59 determines a possibility of the laptop PC 10 being under control of the third party during a period when the user holding the laptop PC 10 moves to the meeting room. In the case where, after the user starts carrying the laptop PC 10 in the start stage S1, the acceleration data continuously indicates the moving state in the intermediate stage S2, it is assumed that the user is never away from the laptop PC 10. Moreover, in the case where the acceleration data is '0' in a short period, it is assumed that the user stops in the middle of the movement while holding the laptop PC 10. This assumption is based on a reason that a predetermined period is required for the laptop PC 10 to fall under control of the third party during the movement. In the case where the acceleration data is '0' for a long period, however, it is assumed that the user leaves the laptop PC 10 during the movement and places the laptop PC 10 in the abandoned state and so there is a possibility of the laptop PC 10 being under control of the third party.

The determination unit 59 applies the time window 80 to the whole time range of the intermediate stage S2, and determines the possibility of the laptop PC 10 being under control of the third party by checking whether or not the acceleration data is continuously '0' for a period longer than the threshold period t2 of the time window 80. In FIG. 3A, since the temporary stationary period tb is shorter than the threshold period t2, the determination unit 59 determines that the laptop PC 10 is under control of the user.

In the end stage S3, the determination unit 59 determines a possibility of the laptop PC 10 being under control of the third party during a period from when the user arrives at the meeting room holding the laptop PC 10 and places the laptop PC 10 on the desk to when the user opens the display housing 1. If the laptop PC 10 is under control of the user in the intermediate stage S2, in the case where the display housing 1 is opened in a short period after arriving at the meeting room, it is assumed that there is a low possibility of the laptop PC 10 being under control of the third party. This assumption is based on a reason that it is difficult for the third party to open the display housing 1 of the laptop PC 10 placed on the desk by the user within a short period. In the case where the display housing 1 is opened after a long period from when the user places the laptop PC 10 on the desk in the meeting room, however, it is assumed that the user may be away from the laptop PC 10 and so there is a possibility of the laptop PC 10 being under control of the third party.

When the laptop PC 10 is placed on the desk at the time tc3, the acceleration data processing unit 57 outputs '0'. The determination unit 59 recognizes the laptop PC 10 to be in the abandoned state during a use preparation period tc in which the display housing 1 is closed and the acceleration data is '0'. In FIG. 3A, since the use preparation period tc is shorter than the threshold period t3, the determination unit 59 determines that the laptop PC 10 is under control of the user as the user places the laptop PC 10 on the desk and opens the display housing 1. As shown in FIG. 3A, as a result of determining that the laptop PC 10 is under control of the user in the start stage S1, the intermediate stage S2, and the end stage S3, the determination unit 59 can determine that there is little or no possibility of the laptop PC 10 being under control of the third party from the use end event to the use start event. In the case where the open event immediately occurs in the intermediate stage S2, that is, in the case where the use preparation period tc has a length of zero with there being no abandoned state, the determination unit 59 determines that the laptop PC 10 remains under control of the user on the ground that there is virtually no end stage S3.

Figure 3B:
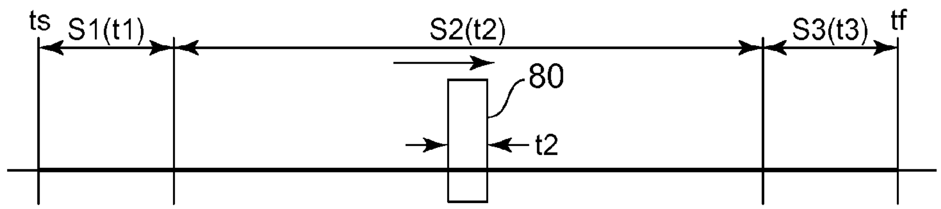
Figure 3C:
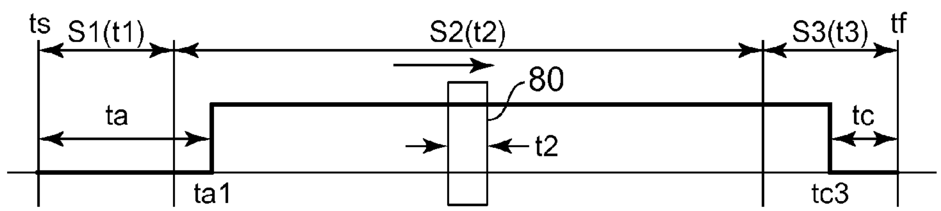

In FIG. 3B, the acceleration data is '0' from the time is to the time tf, indicating that the laptop PC 10 is in the abandoned state. In this case, since the movement preparation period ta exceeds the time tf, the determination unit 59 determines that the user is away from the laptop PC 10 for a long period and so there is a possibility of the laptop PC 10 being under control of the third party. In FIG. 3C, since the movement preparation period ta is longer than the threshold period t1, the determination unit 59 determines that there is a possibility of the laptop PC 10 being under control of the third party in the start stage S1. In one embodiment, when determining that there is a possibility of the laptop PC 10 being under control of the third party in the start stage S1, the determination unit 59 does not perform the determination in the intermediate stage S2 and the end stage S3.

Figure 3D:
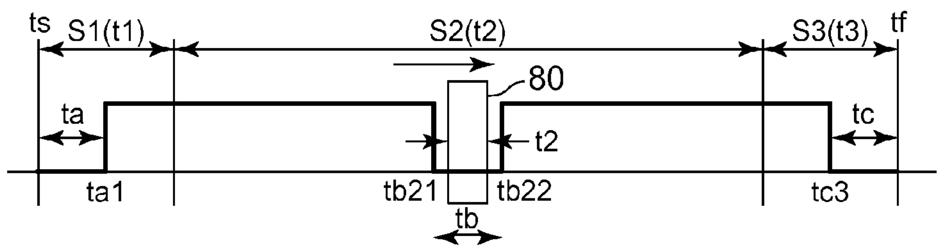
Figure 3E:
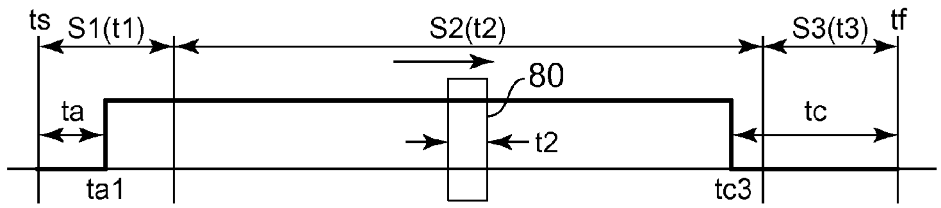

In FIG. 3D, the determination unit 59 determines that the laptop PC 10 is under control of the user in the start stage S1. In the intermediate stage S2, however, since the temporary stationary period tb is longer than the threshold period t2 of the time window 80, the determination unit 59 determines that there is a possibility of the laptop PC 10 being under control of the third party. When determining that there is a possibility of the laptop PC 10 being under control of the third party in the intermediate stage S2, the determination unit 59 may not perform the determination in the end stage S3. In FIG. 3E, the determination unit 59 determines that the laptop PC 10 is under control of the user in the start stage S1 and the intermediate stage S2. In the end stage S3, however, since the use preparation period tc is longer than the threshold period t3, the determination unit 59 determines that there is a possibility of the laptop PC 10 being under control of the third party.

In one embodiment, the user can set the threshold periods t1, t2, and t3 through the interface function of the access control unit 21. In the present subject matter, user authentication can be skipped if the three stages are cleared as a result of the user moving to the meeting room and starting using the laptop PC 10 with such a behavior that allows no control by the third party. In this case, the time information and the binarized acceleration data defined by the behavior of the user can only be generated by the user, and therefore can be regarded as corresponding to password information requested for user authentication. Hence, the user sets the threshold periods t1, t2, and t3 sufficiently short so as to meet his/her behavior and, after closing the display housing 1, carries the laptop PC 10 and opens the display housing 1 at the destination so that the threshold periods t1, t2, and t3 are satisfied. In so doing, security can be ensured while eliminating inconvenience at the time of use.

[Access Control Procedure]

Figure 4:
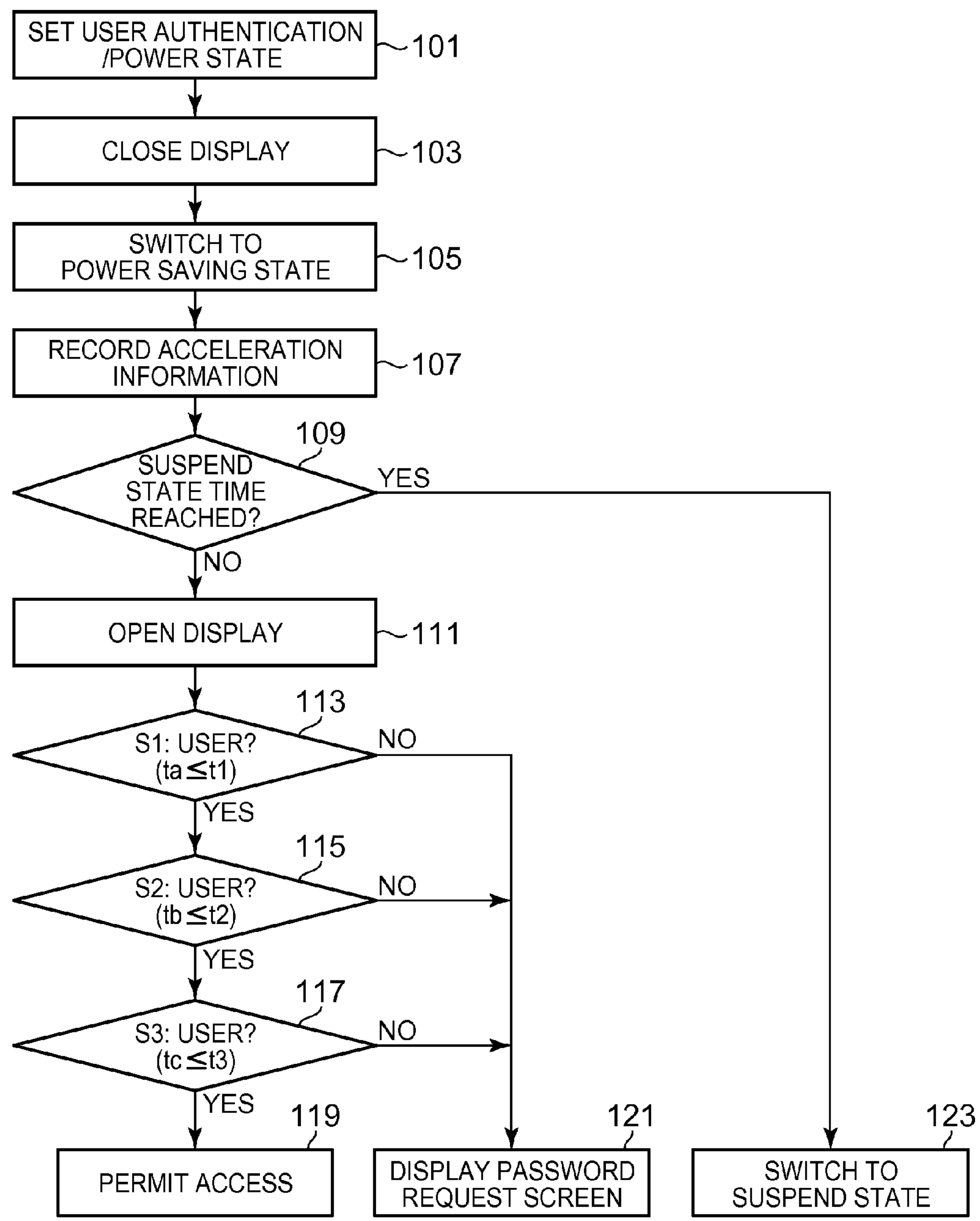
FIG. 4 is a flowchart showing one embodiment a procedure of controlling access to the laptop PC according to the present subject matter.

The following describes on embodiment of a method of controlling access in the laptop PC 10, with reference to a flowchart shown in FIG. 4. In a block 101, the user sets a power state in the power control unit 23. The user also sets user authentication for a predetermined authentication event in the access control unit 21. Here, the user sets the power control unit 23 to enter a suspend state when there is no input from the input device 11 for a predetermined period. The user also sets the power control unit 23 to enter a power saving state of stopping the display and the hard disk drive (HDD) rotation when the display housing 1 is closed. Note that, even in the power saving state, the acceleration sensor 53, the acceleration data processing unit 57, and the acceleration data recording unit 61 may need to be continuously in operation.

The user sets the access control unit 21 to request user authentication when the display housing 1 is closed and then opened. The access control unit 21 sets the application execution unit 19 or the input-output interface 17 to request user authentication when the display housing 1 is opened and stop operation unless a password or a fingerprint is input. The user sets the threshold periods t1, t2, and t3 in the access control unit 21. In a block 103, the user using the laptop PC 10 in the office closes the display housing 1 in order to move to the meeting room. Upon receiving a signal from the lid sensor 51 that detects the closure of the display housing 1, the event generation unit 55 sends the close event to the power control unit 23, the access control unit 21, and/or the acceleration data recording unit 61.

Subsequently, the access control unit 21 requests user authentication when the display housing 1 is opened, unless the determination unit 59 notifies the access control unit 21 of access permission. In a block 105, the power control unit 23 switches the laptop PC 10 to the power saving state. Since it may be expected here that the display housing 1 is opened in a short period, the power saving state can be such a state that does not stop the CPU operation. Note, however, that the present subject matter may be realized without switching the laptop PC 10 to the power saving state in association with access control.

In a block 107, upon receiving the close event, the acceleration data recording unit 61 records acceleration data received from the acceleration data processing unit 57, in the main memory at a predetermined sampling interval. In a block 109, the power control unit 23 determines whether or not a period during which there is no input from the input device 11 exceeds a predetermined period. In the case of determining that there is no input for the predetermined period ("Yes" on block 109), the power control unit 23 switches the laptop PC 10 to the suspend state in a block 123. The laptop PC 10 can subsequently be resumed when the user presses the power button 6 or a function key of the keyboard. To do so, however, the access control unit 21 displays an authentication screen on the display 13 to request password or fingerprint input.

In a block 111, the user or the third party opens the display housing 1. That is, it is assumed here that there is a possibility of the laptop PC 10 falling under control of the third party during the movement. Upon receiving a signal from the lid sensor 51, the event generation unit 55 sends the open event to the power control unit 23, the access control unit 21, the determination unit 59, and the acceleration data recording unit 61. The power control unit 23 returns the power state of the laptop PC 10 to a power on state, according to the open event.

In a block 113, the determination unit 59 performs the determination in the start stage S1. In the case of determining that the movement preparation period to is shorter than the threshold period t1 ("Yes" at block 113), the determination unit 59 determines that the user carries the laptop PC 10 out, and goes to a block 115. Otherwise ("No" at block 113), the determination unit 59 determines that there is a possibility of the laptop PC 10 being carried out by the third party, and goes to a block 121. In the block 121, since the determination unit 59 does not notify the access control unit 21 of access permission, the access control unit 21 displays a prompt for user authentication by a password or a fingerprint on the display housing 1, based on the procedure set in the block 101.

In the case where the user authentication by the password or the fingerprint is successful in the block 121, the access control unit 21 sets access permission in the application execution unit 19 or the input-output interface 17. In the block 115, the determination unit 59 performs the determination in the intermediate stage S2. In the case of determining that the temporary stationary period tb is shorter than the threshold period t2 of the time window 80 throughout the whole time range of the intermediate stage S2 ("Yes" at block 115), the determination unit 59 determines that the user keeps carrying the laptop PC 10, and goes to a block 117. Otherwise ("No" at block 115), the determination unit 59 determines that there is a possibility of the laptop PC 10 being under control of the third party, and goes to the block 121.

In the block 117, the determination unit 59 performs the determination in the end stage S3. In the case of determining that the use preparation period tc is shorter than the threshold period t3 ("Yes" at block 117), the determination unit 59 determines that the user opens the display housing 1 in the meeting room, and goes to a block 119. Otherwise ("No" at block 117), the determination unit 59 determines that there is a possibility that the third party opens the display housing 1 in the meeting room, and goes to the block 121. In the block 119, the determination unit 59 determines that the laptop PC 10 is under control of the user in the three stages from the movement start to the movement end, and notifies the access control unit 21 of access permission.

In response to receiving the notification, the access control unit 21 sets access permission in the application execution unit 19 or the input-output interface 17. The CPU operation continues from when the close event is generated to when the open event is generated. Accordingly, the determination unit 59 can complete the determinations from the block 113 to the block 117 in a very short period upon receiving the open event from the event generation unit 55. This enables the user to immediately access the laptop PC 10 upon opening the display housing 1 without being requested to perform user authentication in the block 119.

In the procedure shown in FIG. 4, the determination may be performed only in the block 113 while omitting the blocks 115 and 117. The determination may also be performed only in the blocks 113 and 115 while omitting the block 117. The determination may further be performed only in the bocks 113 and 117 while omitting the block 115. In the blocks 113 to 117 shown in FIG. 4, focus is given on the state where the laptop PC 10 is under control of the user based on the acceleration data and the time information and, in the case where there is no acceleration data indicating the state, it is determined that there is a possibility of the laptop PC 10 being under control of the third party. Alternatively, focus may be given on the state where the laptop PC 10 is under control of the third party so that, in the case where there is acceleration data and time information indicating the state, it is determined that there is a possibility of the laptop PC 10 being under control of the third party.

For example, in the block 113 in FIG. 4, in the case where any of the movement preparation period ta, the temporary stationary period tb, and the use preparation period tc is longer than a corresponding one of threshold periods "t1−1", "t2−1", and "t3−1", the procedure goes to the block 121 to display the password request screen. In such a case, the threshold periods "t1−1", "t2−1", and "t3−1" may be set longer than the threshold periods t1, t2, and t3, respectively.

The close event generated by the lid sensor 51 may be regarded as a use end event where the use of the laptop PC 10 ends or a movement start event for starting the movement of the laptop PC 10. The use end event or the movement start event may be generated when a period during which there is no input from the input device 11 exceeds a predetermined period or a function key of the keyboard 7 is pressed.

The open event generated by the lid sensor 51 may be regarded as a use start event where the use of the laptop PC 10 starts or a movement end event where the movement of the laptop PC 10 ends. The use start event or the movement end event may be generated when the power button 6 for powering on or a function key of the keyboard 7 is pressed.

[Exemplary Application to a Tablet PC and the Like]

Figures 5A, 5B, 5C, 5D:
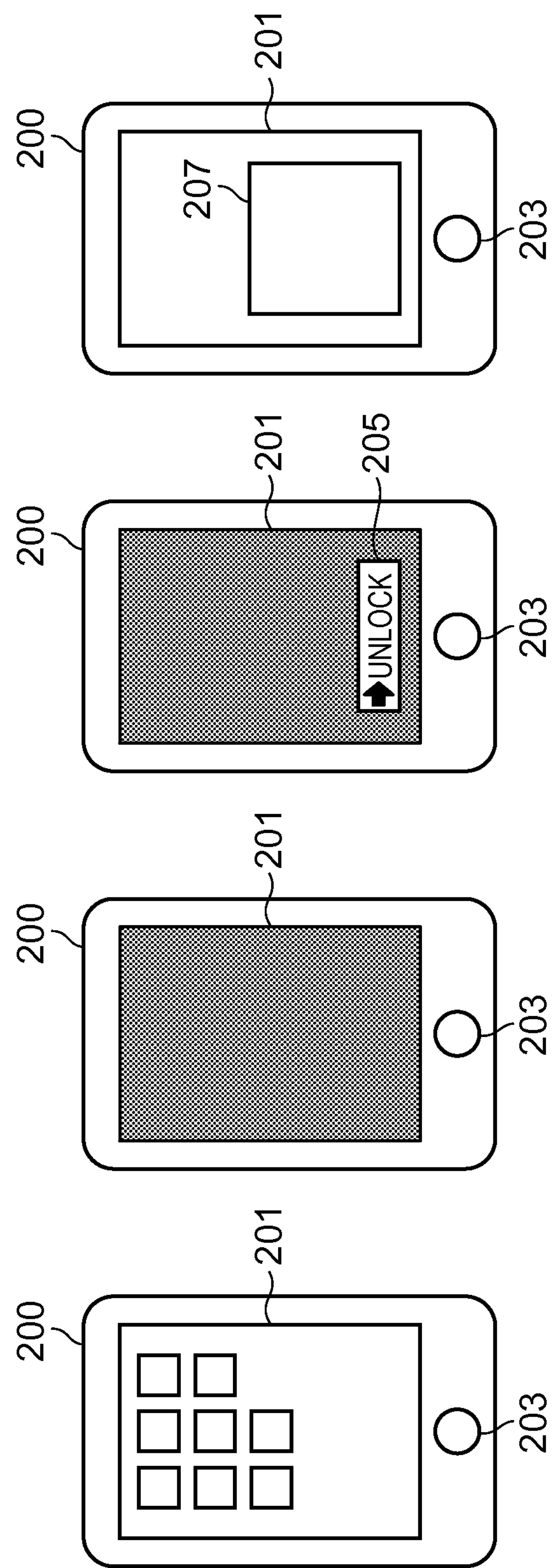
FIG. 5A-5D are diagrams showing one embodiment of applying the present subject matter to a tablet mobile terminal.

The present subject matter may be applicable to a mobile terminal such as a mobile phone, a smartphone, a tablet PC, or any other information processing device whose display may be constantly exposed with there being no display cover. FIG. 5 is a diagram showing a situation where a smartphone 200 requests a password. In FIG. 5A, a desktop screen is displayed on a display 201, enabling the user to tap an icon to execute an application.

When there is no access to the display 201 for a predetermined period, the smartphone 200 clears the screen to switch to the power saving state, as shown in FIG. 5B. In FIG. 5C, when an access button 203 is pressed in a state where the screen is cleared, a slide bar 205 for returning to the desktop screen is displayed on the display 201. Sliding the slide bar 205 with a finger allows the user to return to the desktop screen shown in FIG. 5A. In the case where a password is set, however, a password input image 207 is displayed on the display 201 as shown in FIG. 5D. The user inputs password information by tapping symbols displayed on the input image 207 in a predetermined order, as a result of which the desktop screen shown in FIG. 5A is displayed.

In the laptop PC 10, the time is at which a possibility of the laptop PC 10 being under control of the third party arises may be set by the close event according to the signal from the lid sensor 51. Moreover, the time tf at which whether or not there is a possibility of the laptop PC 10 being under control of the third party is determined may be set by the open event according to the signal from the lid sensor 51. In the smartphone with no lid sensor, the use end event may be generated at the time of switching to the state shown in FIG. 5B, and the use start event may be generated at the time of operating the slide bar 205 shown in FIG. 5C.

The procedure shown in FIG. 4 can be applied to the smartphone 200 in the following manner. When the smartphone 200 enters the state shown in FIG. 5B while the user is using the smartphone 200 and the operation shown in FIG. 5C is performed, in the case where the determination unit 59 determines that the smartphone 200 is under control of the user in the three stages from the start stage S1 to the end stage S3, the return operation screen in FIG. 5C is directly changed to the state where the desktop screen in FIG. 5A is displayed, without displaying the password request screen in FIG. 5D. In the case where the determination unit 59 determines that there is a possibility of the smartphone 200 being under control of the third party in any of the stages, on the other hand, the password request screen in FIG. 5D is displayed.

Moreover, the start event may be generated when the access button 203 is operated in FIG. 5C. Here, in the case where the determination unit 59 determines that the smartphone 200 is under control of the user in the three stages, the smartphone 200 is directly returned from the state in FIG. 5B to the state in FIG. 5A, without displaying the return operation screen in FIG. 5C and the password input screen in FIG. 5D. In the case where the determination unit 59 determines that there is a possibility of the smartphone 200 being under control of the third party in any of the stages, the return operation screen in FIG. 5C and the password input screen in FIG. 5D are displayed. If an intentional operation of the access button 203 cannot be distinguished from an unintentional touch of the access button 203, the smartphone 200 could be accidentally returned to the state in FIG. 5A. In view of this, the generation of the start event may be suppressed unless the access button 203 is continuously pressed for a predetermined period or more.

In one embodiment, the handheld smartphone 200 is not in a horizontal posture in the use state, unlike the laptop PC. Accordingly, the binarized acceleration data may be generated by defining, as the use state, a posture of the smartphone 200 in a predetermined range when the user operates the smartphone 200 by holding it with his/her hand, and defining, as the moving state, a posture of the smartphone 200 outside the predetermined range.

Though the present subject matter has been described by way of the specific embodiment shown in the drawings, the present subject matter is not limited to the embodiment shown in the drawings, and any known structure may be employed so long as the effects of the present subject matter can be achieved.

DESCRIPTION OF SYMBOLS

10: laptop PC
80: time window
200: smartphone
ta: movement preparation period
tb: temporary stationary period
tc: use preparation period
t1, t2, t3: threshold periods Embodiments may be practiced in other specific forms. The described embodiments are to be considered in all respects only as illustrative and not restrictive. The scope of the subject matter is, therefore, indicated by the appended claims rather than by the foregoing description. All changes which come within the meaning and range of equivalency of the claims are to be embraced within their scope.

What is claimed is:

1. A method comprising:

generating a use end event indicating an end of use of a mobile terminal;

binarizing acceleration of the mobile terminal measured by the mobile terminal after the use end event is generated to one of a first value indicating a stationary state and a second value indicating a moving state;

generating a use start event indicating a start of use of the mobile terminal;

measuring a movement preparation period from a time at which the use end event is generated to a time at which a transition from the first value to the second value occurs; and requesting user authentication in response to the use start event and in response to the movement preparation period exceeding a first threshold.

2. The method according to claim 1, comprising:

measuring a temporary stationary period from a time at which a transition from the second value to the first value occurs to a time at which a transition from the first value to the second value occurs, the temporary stationary period a period during which the mobile terminal continues in a temporary stationary state; and requesting the user authentication in response to the use start event and in response to the movement preparation period not exceeding the first threshold and the temporary stationary period exceeding a second threshold.

3. The method according to claim 2, comprising:

measuring a use preparation period from a time at which a transition from the second value to the first value occurs to a time at which the use start event is generated; and requesting the user authentication in response to the use start event and in response to the movement preparation period not exceeding the first threshold, the temporary stationary period not exceeding the second threshold, and the use preparation period exceeding a third threshold.

4. The method according to claim 3, comprising:

permitting access without requesting the user authentication in response to the use start event and in response to the movement preparation period not exceeding the first threshold, the temporary stationary period not exceeding the second threshold, and the use preparation period not exceeding the third threshold.

5. The method according to claim 1, comprising:

measuring a use preparation period from a time at which a transition from the second value to the first value occurs to a time at which the use start event is generated; and requesting the user authentication in response to the use start event and in response to the movement preparation period not exceeding the first threshold and the use preparation period exceeding a third threshold.

6. The method according to claim 1, wherein the use end event is generated in response to closing of a display housing of the mobile terminal, and the use start event is generated in response to opening of the display housing of the mobile terminal.

7. The method according to claim 1, wherein a processor continues operation from the use end event to the use start event.

8. A mobile terminal comprising:

an acceleration sensor for measuring an acceleration of the mobile terminal;

an acceleration data processing unit for generating acceleration data obtained by binarizing an output of the acceleration sensor to a first value indicating a stationary state and a second value indicating a moving state;

an acceleration data recording unit for recording the acceleration data from a use end event indicating an end of use of the mobile terminal to a use start event indicating a start of use of the mobile terminal; and a determination unit for measuring, in response to the use start event, a movement preparation period from a time at which the use end event is generated to a time at which a transition from the first value to the second value occurs using the acceleration data, and determining access prohibition for the mobile terminal in response to the movement preparation period exceeding a first threshold.

9. The mobile terminal according to claim 8, wherein the determination unit measures a temporary stationary period from a time at which a transition from the second value to the first value occurs to a time at which a transition from the first value to the second value occurs, and determines the access prohibition for the mobile terminal in response to the movement preparation period not exceeding the first threshold and the temporary stationary period exceeding a second threshold.

10. The mobile terminal according to claim 9, wherein the determination unit measures a use preparation period from a time at which a transition from the second value to the first value occurs to a time at which the use start event is generated, and determines the access prohibition for the mobile terminal in response to the movement preparation period not exceeding the first threshold, the temporary stationary period not exceeding the second threshold, and the use preparation period exceeding a third threshold.

11. The mobile terminal according to claim 10, wherein the determination unit determines access permission for the mobile terminal in response to the movement preparation period not exceeding the first threshold, the temporary stationary period not exceeding the second threshold, and the use preparation period not exceeding the third threshold.

12. The mobile terminal according to claim 8, wherein the determination unit measures a use preparation period from a time at which a transition from the second value to the first value occurs to a time at which the use start event is generated, and determines the access prohibition for the mobile terminal in response to the movement preparation period not exceeding the first threshold and the use preparation period exceeding a third threshold.

13. The mobile terminal according to claim 8, wherein the mobile terminal is a mobile information processing device that includes a system housing and a display housing attached to the system housing so as to be openable and closable, and the use end event and the use start event are generated according to an open/close state of the display housing.

14. The mobile terminal according to claim 8, wherein the mobile terminal is a tablet electronic device, the use end event is generated when there is no input to the tablet electronic device for a predetermined period and the use start event is generated when an access button of the tablet electronic device is pressed.

15. A computer program product comprising a storage device storing machine readable code executed by a processor to perform the operations of:

generating a use end event indicating an end of use of an information processing device;

determining whether an acceleration measured by the information processing device after the use end event is generated indicates a stationary state or a moving state;

generating a use start event indicating a start of use of the information processing device;

measuring a movement preparation period from a time at which the use end event is generated to a time at which a transition from the stationary state to the moving state occurs; and restricting access to the information processing device in response to the use start event and in response to the movement preparation period exceeding a first threshold.

16. The computer program product according to claim 15, further comprising:

measuring a temporary stationary period from a time at which a transition from the moving state to the stationary state occurs to a time at which a transition from the stationary state to the moving state occurs, the temporary stationary period a period during which the information processing device continues in a temporary stationary state; and restricting access to the information processing device in response to the use start event and in response to the movement preparation period not exceeding the first threshold and the temporary stationary period exceeding a second threshold.

17. The computer program according to claim 16, further comprising:

measuring a use preparation period from a time at which a transition from the moving state to the stationary state occurs to a time at which the use start event is generated; and restricting access to the information processing device in response to the use start event and in response to the movement preparation period not exceeding the first threshold, the temporary stationary period of not exceeding the second threshold, and the use preparation period exceeding a third threshold.

18. The computer program according to claim 17, further comprising permitting access to the computer in response to the use start event and in response to the movement preparation period not exceeding the first threshold, the temporary stationary period not exceeding the second threshold, and the use preparation period not exceeding the third threshold.

19. The computer program according to claim 15, further comprising:

measuring a use preparation period from a time at which a transition from the second value to the first value occurs to a time at which the use start event is generated; and restricting access to the computer in response to the use start event and in response to the movement preparation period not exceeding the first threshold and the use preparation period exceeding a third threshold.

20. A method comprising:

generating a use end event indicating an end of use of the mobile terminal;

measuring, by the mobile terminal, a movement preparation period from a time at which the use end event is generated to a time when movement of the mobile terminal starts;

generating a use start event indicating a start of use of the mobile terminal; and requesting user authentication in response to the use start event and in response to the movement preparation period exceeding a predetermined threshold.

* * * * *